(No Model.)

H. IHNEN.
FENCE.

No. 399,617. Patented Mar. 12, 1889.

WITNESSES:
O. P. Morgan,
W. B. Caill

INVENTOR:
Harro Ihnen.
By A. C. Thayer.
his Attorney.

UNITED STATES PATENT OFFICE.

HARRO IHNEN, OF JERSEY CITY, NEW JERSEY.

FENCE.

SPECIFICATION forming part of Letters Patent No. 399,617, dated March 12, 1889.

Application filed April 16, 1888. Serial No. 270,786. (No model.)

*To all whom it may concern:*

Be it known that I, HARRO IHNEN, a citizen of the United States, and a resident of Jersey City, in the county of Hudson and State of New Jersey, have invented certain new and useful Improvements in Fences, of which the following is a specification.

My invention consists of a tilting top attachment to yard and other fences designed for a cat and chicken guard for obstructing their crossing, said guard being so contrived as to meterially prevent the ascent of cats from either side, and to tilt and throw chickens back into the yard when alighting on the top for the purpose of passing over, as hereinafter fully described, reference being made to the accompanying drawings, in which—

Figure 1:
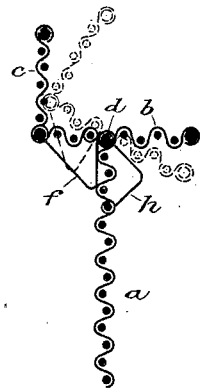
Figure 2:
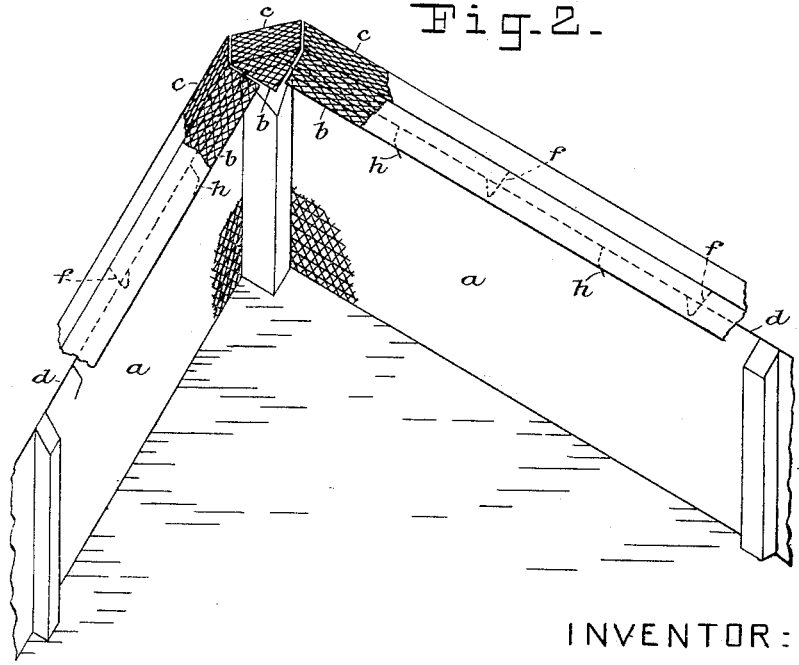

Figure 1 is an end elevation, and Fig. 2 is a perspective view, of my improved fence.

On a woven-wire or any other form of fence, $a$, I arrange the tilting guard, consisting of the horizontally-arranged top rail or cap, $b$, and the vertically-disposed angle-plate or flange $c$, rising upward from one edge of the cap, said cap or top $b$ being pivoted at its middle, or thereabout, and slightly overbalanced for returning to its normal position, so that a fowl alighting on the side not having the flange will tilt that side of the guard down, as indicated in the dotted lines, and, the flange swinging over or against the fowl, will compel it to fly down again into the yard, the guard being adjusted relatively to the yard with the unflanged side of the guard inward and the flanged part outward thereto. This improved guard is contrived with reference to a peculiarity of domestic fowls for alighting on the first part of the fence or other object they come to in their efforts to pass over, and therefore presents the inner and downwardly-tilting extremity for their reception, where by their additional weight they tilt downward with such uncertain footing as to defeat further attempts to go over even without the flange $c$, and are turned back into the yard, and said tilting guard may be used without the flange, though I prefer to employ it as a more effectual device both for fowls and cats.

It will be seen that a cat climbing up the fence on the downwardly-tilting side will be defeated by it, and will be unable to climb over the flange of the other side.

For corners the fence may be guarded with prongs, or a like tilting guard may be placed diagonally thereon.

The guard will preferably be made of woven wire, as represented in the drawings, and will be hinged or pivoted to the top wire, $d$, of the fence in any approved way, and the weighted side is provided with stop-shoulders $f$, which have contact with the side of the fence a little below the top and hold it in the normal position; but said guard may be made of sheet-iron or thin boards, and the contrivance of hinges and stops may be varied at will.

It is to be understood that the arrangement is to be such that the guard will not be revolved so far by any tilting force as to prevent it from gravitating back to the normal position represented by the full or solid lines, in which position it is sustained by the stops $f$.

The means of insuring the automatic return of the guard to the horizontal position by preventing the center of gravity from passing the pivotal center may consist of the inside or downwardly-tilting part coming in contact with the inside of the upper portion of the fence, or with the inner top angle of the fence, when applied to a fence having a top rail of sufficient breadth for that purpose, which constitute stops, or the inside of the fence or the lower side of the cap may have special stop-brackets $h$ to arrest it in a shorter range in case the cap would otherwise swing too far, said stops being in this case attached to the side of the fence under the downwardly-tilting side of the cap, and so adjusted relatively thereto that said part of the cap will come in contact with the upper ends of said stops and be prevented from swinging too far. Said stops consist in this instance of wire brackets suitably attached to the side of the fence under said downwardly-tilting side of the cap; but they may consist of blocks of wood or other approved material.

While it may be said that there may be a possibility of a fowl clinging to the cap, particularly if made of open wire-work, affording a good footing, and still being able to fly over the fence, they will generally be turned back, and more so if the tilting part of the cap is smooth plate-iron or board, and however made it will be very effectual against cats.

What I claim, and desire to secure by Letters Patent, is—

1. The combination, with a fence, of a horizontally-arranged tilting cap or top plate and supports to maintain it normally in said position, said cap being hinged or pivoted thereto, so as to tilt downward one side and upward the other side of the fence, and slightly overbalanced for automatically returning to the normal position, substantially as described.

2. The combination, with a fence, of a tilting cap or top hinged or pivoted thereto and stops to maintain it normally in the horizontal position, said cap being slightly overbalanced and also having stops to limit the tilting action for automatically returning to the horizontal position, and said cap or top being constructed with an upwardly-projecting flange or angle-plate on the upwardly-tilting side, substantially as described.

Signed at New York city, in the county of New York and State of New York, this 27th day of March, A. D. 1888.

HARRO IHNEN.

Witnesses:
W. J. MORGAN,
GEO. T. JANVRIN.